United States Patent
Bernal et al.

(10) Patent No.: US 8,970,910 B2
(45) Date of Patent: Mar. 3, 2015

(54) VISIBLE AND INVISIBLE WATERMARKING OF PRINTED IMAGES VIA $2^{nd}$ GENERATION STOCHASTIC SEED FREQUENCY MODULATION

(75) Inventors: Edgar A. Bernal, Webster, NY (US);
Shen-ge Wang, Fairport, NY (US);
Robert P. Loce, Webster, NY (US);
Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 588 days.

(21) Appl. No.: 13/313,329

(22) Filed: Dec. 7, 2011

(65) Prior Publication Data

US 2013/0148168 A1 Jun. 13, 2013

(51) Int. Cl.
*H04N 1/405* (2006.01)
*G06K 15/00* (2006.01)

(52) U.S. Cl.
USPC .......... 358/3.06; 358/1.9; 358/3.28; 382/100; 713/176; 340/5.28; G9B/20.002

(58) Field of Classification Search
None
See application file for complete search history.

(56) References Cited

U.S. PATENT DOCUMENTS

| | | | |
|---|---|---|---|
| 5,673,121 A | 9/1997 | Wang | |
| 5,734,752 A | 3/1998 | Knox | |
| 5,790,703 A | 8/1998 | Wang | |
| 6,252,971 B1 | 6/2001 | Wang | |
| 7,286,682 B1 | 10/2007 | Sharma et al. | |
| 7,554,699 B2 * | 6/2009 | Wang et al. | 358/3.28 |
| 7,660,429 B2 | 2/2010 | Shaked et al. | |
| 8,693,061 B2 * | 4/2014 | Sanger | 358/3.28 |
| 2006/0170974 A1 | 8/2006 | Wang et al. | |
| 2006/0256386 A1 | 11/2006 | Gu | |
| 2010/0150433 A1 | 6/2010 | Wang et al. | |

FOREIGN PATENT DOCUMENTS

| | | |
|---|---|---|
| EP | 1 881 690 A2 | 1/2008 |
| EP | 1 956 825 A2 | 8/2008 |

OTHER PUBLICATIONS

U.S. Appl. No. 13/096,429, filed Apr. 28, 2011, by Bernal et al.
U.S. Appl. No. 13/096,520, filed Apr. 28, 2011, by Bernal et al.
U.S. Appl. No. 13/108,235, filed May 16, 2011, by Wang et al.
Oztan et al., "Continuous phase modulated halftones and their application to halftone data embedding," ICASSP 2006.
GB Search Report of corresponding GB Patent Application No. 1220877.3, dated May 21, 2013.

\* cited by examiner

*Primary Examiner* — Quang N Vo
(74) *Attorney, Agent, or Firm* — Fay Sharpe LLP

(57) ABSTRACT

As set forth herein, computer-implemented methods and systems facilitate watermarking documents and/or images using $2^{nd}$ generation stochastic halftoning. The watermark is used to spatially vary the gray level at which a frequency modulation-to-amplitude modulation transition occurs. The encoding algorithm uses as inputs a contone image and a watermark. The visibility of the watermark is controlled by the magnitude of the difference between the AM-to-FM transition threshold values.

12 Claims, 13 Drawing Sheets
(6 of 13 Drawing Sheet(s) Filed in Color)

VISIBLE AND INVISIBLE WATERMARKING OF PRINTED IMAGES VIA 2$^{nd}$ GENERATION STOCHASTIC SEED FREQUENCY MODULATION

TECHNICAL FIELD

The presently disclosed embodiments are directed toward methods and systems for printing, reproducing or displaying images. More particularly, the teachings disclosed herein are applicable to methods and apparatuses wherein clustered-dot halftoning is implemented.

BACKGROUND

Digital images may be formatted as contone (continuous tone) images having a wide range of tonal values or may be formatted as coarsely quantized images having a limited number of tonal values, such as two levels for a binary image. Digital halftoning is a process of transforming a contone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

Digital images and the resulting prints are formed of one or more colorant separations, also referred to as "color separations." A monochrome image is formed of one colorant separation, typically black. Process color images are typically constructed of cyan, magenta, yellow, and black separations. Duotone and tritone images are formed of two and three separations, respectively. Spot color images have multiple colorant separations, where at least one colorant is positioned spatially non-overlapping with other colorants. Extended colorant set images typically include the process-color colorant separations plus one or more additional colorant separations such as green, orange, violet, red, blue, white, varnish, light cyan, light magenta, gray, dark yellow, metallics, and so forth. In the present teachings, we will use the terms "color images", "color dots", "color spots", "colorant" and similar language to refer to images and marking systems with any number of colorants. The teachings herein apply particularly to any individual color separation of a digital image and resulting print, where that digital image or print can be composed of one or more separations. With the advent of computers, it is desirable for graphic artists and others to manipulate contone images and print them as halftone images. However, typical computer printers and typesetters are incapable of printing individual halftone dots in an infinite number of sizes. Instead, each halftone dot of a printed picture is in turn comprised of a collection of discrete, smaller "spots" or "pixels", which are generally the smallest marks a printer or typesetter can make.

A common halftone technique is called screening, which compares the required continuous color tone level of each pixel for each color separation with one or more predetermined threshold levels. The predetermined threshold levels are typically defined for halftone cells that are tiled to fill the plane of an image, thereby forming a halftone screen of threshold values. At a given pixel, if the required color tone level is greater than the halftone threshold level for that pixel, a "1" is generated in the halftone output, so that a colorant spot is printed at that specified pixel in the subsequent printing operation. If the required color tone at a given pixel is less than the halftone threshold level for that pixel, a "0" is generated in the halftone output, so that a colorant spot is not printed at that specified pixel in the subsequent printing operation. The output of the screening process is a binary pattern that controls the printing of multiple small spots or pixels that are printed. The printed spots can be grouped or "clustered" to form print structures that are relatively stable for a given printing process. These clusters are referred to as "clustered-dots" or "dots", and they are regularly spaced as determined by the size, shape, and tiling of the halftone cell. Conventional periodic halftone screens and halftone screen outputs can be considered as two-dimensional repeated patterns, possessing two fundamental spatial frequencies, which are completely defined by the geometry of the halftone screens.

In this manner, a "digital screen" is created as an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the halftone threshold value of the corresponding pixel in the halftone screen, and the pixel is darkened in the subsequent print image if the gray level of the contone sample is greater than the threshold value for that pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

Halftoning attempts to render images to printable form while avoiding unwanted visual texture, known as moiré, and tone reproduction irregularities. The two key aspects of halftone screen design are the geometry of periodic dot placement and the shape of the halftone dots. Controlling halftone dot shape has been a lower priority in laser printers because printer pixel resolution, typically measured in rasters per inch referring to the number of smallest printable spots per unit length, has been too low. Consider, for example, the task of controlling dot shape of a 212 cell per inch (cpi) 45° halftone screen used with a printer having a resolution of 600 rasters/inch, where the halftone cell is only two rasters in height. As laser printing resolutions reach 2400 rasters/inch, and greater, controlling halftone dot shape provides a greater impact in improving a printed image.

As pixel resolution has increased with advancements in processor speed, memory capacity, printer and/or display capability, and the like, new options in halftone geometry have arisen. One area of development has been the so-called 2$^{nd}$ generation stochastic screens, where nuclei (seeds) are placed in a stochastic manner using frequency modulation (FM) up to a particular gray level, then grown in size using amplitude modulation (AM) above that level. This approach leads to a limit of the highest allowable seed frequency, which is uniquely determined by the gray level at which the transition from FM to AM occurs. Conventional approaches have attempted to adjust seed frequency according to image busyness to improve detail rendition, but examples produced using such methods show relatively poor quality, as is described in co-pending U.S. patent application Ser. No. 13/108,235, which is hereby incorporated by reference in its entirety herein.

One class of methods of growing these dots operates in the frequency domain. These "green noise"-like methods adjust a frequency spectrum while neglecting fundamental design principles relating to dot shape and touching.

A second class of $2^{nd}$ generation stochastic screens uses random seeds, then applies a fixed threshold array to control growth around the seeds. While these methods attempt to control growth in the spatial domain, where better control is possible, a fixed threshold array on random seeds tends to produce high graininess and poor touch points.

A third class attempts to use parameters to control the growth within a Voronoi tessellation formalism. These methods seem to be using a sound strategy of defining a spatial tessellation and attempting to control growth and touching between the tiles for the purposes of print-to-print stability and uniformity. But, the growth control seems to be quite suboptimal, offering much less control than is available for growing periodic dots. The lack of control not only affects stability and uniformity, but does not allow dot shaping for aesthetic purposes, such as using rounder dots for faces, squarer sharper dots for graphics, extended highlight dots (avoid touching until into the shadows) and extended shadow dots (which touch early and focus on hole shape), as is described in co-pending U.S. patent application Ser. No. 13/096,429, which is hereby incorporated by reference in its entirety herein.

Watermarking images refers to a set of technologies that embed information into an image. The information may be embedded for a variety of reasons including identifying authorship, creation details, counterfeit prevention, rendering details, and information on content. Most existing watermarking methods apply to contone images and are not robust to the printing process. Halftone-based watermarking allows data embedding in images as part of the printing process. The embedded data can be used for a variety of applications such as ownership protection, authentication, covert communication, and any other usage that can benefit from additional information. Most existing halftone-based watermarking methods are designed for $1^{st}$ generation stochastic screens (FM) as described in, e.g., U.S. Pat. Nos. 5,790,703 and 5,734,752; periodic clustered-dot screens (AM) as described in U.S. Pat. Nos. 6,252,971 and 7,286,682 as well as in Oztan and Sharma's "Continuous phase modulated halftones and their application to halftone data embedding" (ICASSP 2006); or error diffusion as is described in U.S. Pat. No. 7,660,429. The foregoing references are hereby incorporated by reference in their entireties herein. $2^{nd}$ generation stochastic halftones (FM to AM) are becoming increasingly popular due to the increased resolution of new printing devices, and they overcome some of the issues associated with periodic screens and $1^{st}$ generation stochastic halftones. There is a need in the art for systems and methods that facilitate watermarking $2^{nd}$ generation stochastic halftones.

BRIEF DESCRIPTION

In one aspect, a computer-implemented method for generating a watermarked halftone image using $2^{nd}$ generation stochastic halftoning to binarize pixels comprises receiving a contone input image and watermark image data, and determining seed locations based on a gray level of the input image at given locations within the image and based on a presence or absence of a watermark at those locations, where watermark regions have a first FM-to-AM transition threshold and non-watermark regions have a second FM-to-AM transition threshold. The method further comprises determining a tessellation based on the seed locations, calculating a halftone spot function to determine a spot function value for each pixel in the input image based on the tessellation determined by the seed locations, comparing an input pixel value to a co-located spot function value for each pixel in the input image to generate the watermarked halftone image, and outputting the watermarked halftone image.

In another aspect, a computer-implemented method for generating a watermarked halftone image using a plurality of $2^{nd}$ generation stochastic halftone threshold arrays to binarize pixels comprises receiving a contone input image, a first $2^{nd}$ generation stochastic halftone threshold array, a second $2^{nd}$ generation stochastic halftone threshold array, and watermark image data, and selecting halftone thresholds from the first $2^{nd}$ generation stochastic halftone threshold array for pixels in a region of watermark image data. The method further comprises selecting halftone thresholds from the second $2^{nd}$ generation stochastic halftone threshold array for pixels in a region of non-watermark image data, and, for each pixel in the input image, comparing an input pixel value to a selected co-located threshold value for the input pixel to generate the watermarked halftone image. Additionally, the method comprises outputting the watermarked halftone image.

In another aspect, a computer-implemented method for generating a watermarked halftone image using $2^{nd}$ generation stochastic halftoning to binarize pixels comprises receiving a contone input image and watermark image data, receiving a set of seeds at a first principal frequency, receiving a set of seeds at a second principal frequency, placing seeds from the first set in regions of watermark image data, placing seeds from the second set in regions of non-watermark image data and determining a tessellation for the resulting set of seeds. The method further comprises calculating a halftone spot function corresponding to the resulting tessellation. Additionally, the method comprises comparing pixel values with co-located halftone spot function values to generate binary pixel values, and outputting the watermarked halftone image.

According to another aspect, a computer-implemented method for decoding a watermarked halftone image comprises determining a local dot count and a local hole count for a block of pixels in a received watermarked halftone image by comparing the local dot count and the local hole count to each of a first stochastic screen signature and a second stochastic screen signature that has a higher dot frequency than the first stochastic screen signature, determining whether the dot count is greater than the hole count, and, if the dot count is greater than the hole count and falls within a span of a plateau in the second stochastic screen signature, determining that the dot count corresponds to a watermark. The decoded image is then output.

In another aspect, a system that facilitates generating a watermarked halftone image using 2nd-generation stochastic halftoning to binarize pixels comprises a memory that persistently stores computer-executable instructions for execution by a processor, wherein the processor is configured to receive a contone input image and watermark image data. The processor is further configured to determine seed locations based on a gray level of the input image at given locations within the image and based on a presence or absence of a watermark at the locations within the image, wherein watermark regions have a first FM-to-AM transition threshold and non-watermark regions have a second FM-to-AM transition threshold, and to determine a tessellation based on the seed locations. Additionally, the processor is configured to calculate a halftone spot function to determine a spot function value for each pixel in the input image based on the tessellation determined by the seed locations, compare an input pixel value to a co-located spot function value for each pixel in the input image to generate the watermarked halftone image, and output the watermarked halftone image to one or more of a printer that prints the watermarked halftone image and a graphical user interface (GUI) on which the watermarked halftone image is displayed.

According to another aspect, a system that facilitates decoding a watermarked halftone image comprises a memory that persistently stores computer-executable instructions for execution by a processor, wherein the processor is configured to determine a local dot count and a local hole count for a block of pixels in a received watermarked halftone image by comparing the local dot count and the local hole count to each of a first stochastic screen signature and a second stochastic screen signature that has a higher dot frequency than the first stochastic screen signature. The processor is further configured to determine whether the dot count is greater than the hole count, and if the dot count is greater than the hole count and falls within a span of a plateau in the second stochastic screen signature, determine that the dot count corresponds to a watermark. Additionally, the processor is configured to output a decoded image to at least one of a printer that prints the decoded image and a graphical user interface (GUI) that displays the decoded image to a user.

BRIEF DESCRIPTION OF THE DRAWINGS

The file of this patent contains at least one drawing executed in color. Copies of this patent with color drawing(s) will be provided by the U.S. Patent and Trademark Office upon request and payment of the necessary fee.

DETAILED DESCRIPTION

The above-described problem is solved by providing a halftoning method that adapts the spatial distribution of $2^{nd}$ gen halftone dot seeds for purposes of data embedding. The method adaptively determines an FM-to-AM transition threshold of a halftone screen based on the presence or absence of a watermark. The amount by which the threshold is varied determines whether the watermark is visible or not.

Figure 1:
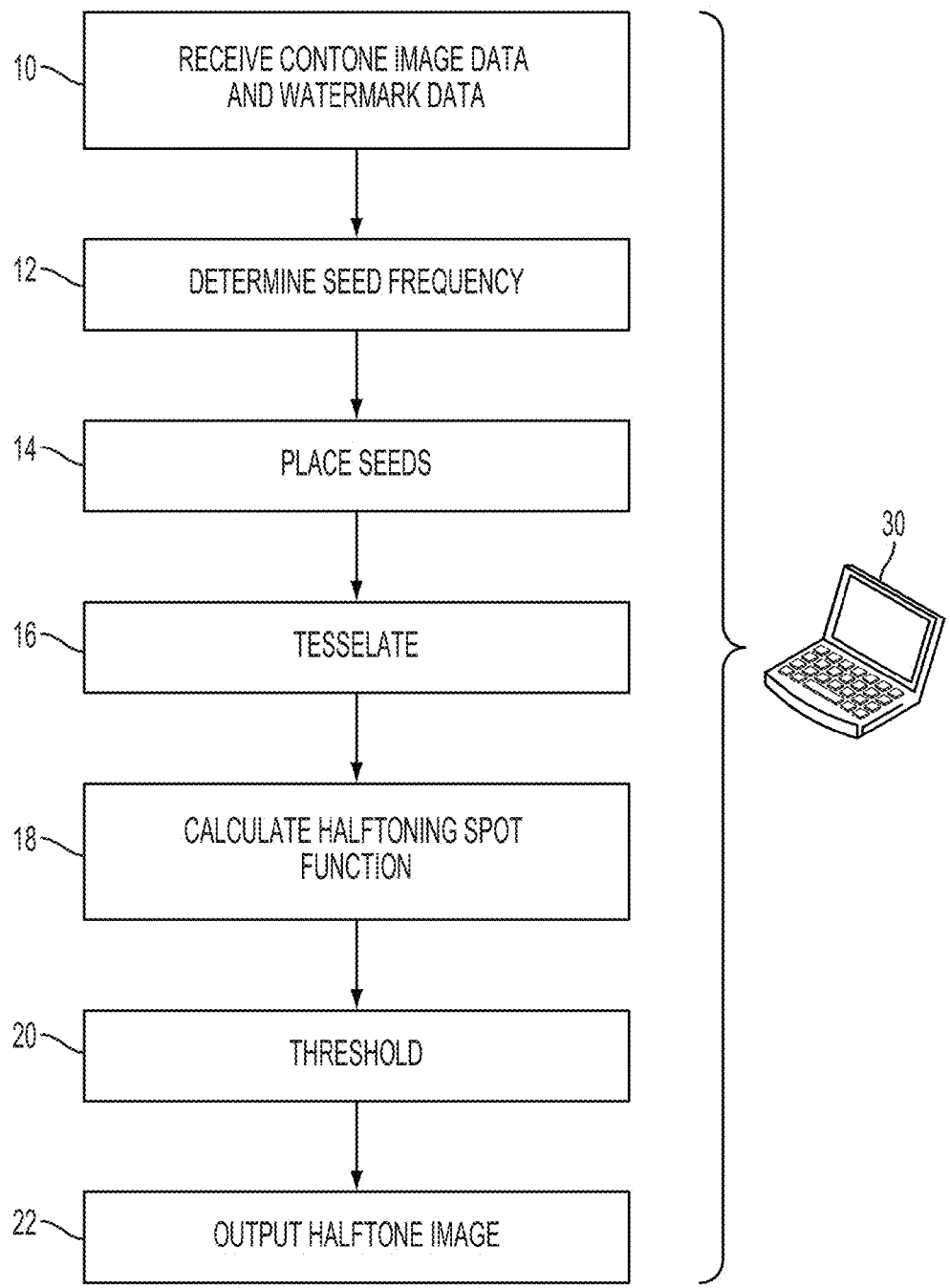
FIG. 1 illustrates a $2^{nd}$ generation halftoning method that manipulates the spatial distribution of seed points in a $2^{nd}$ generation halftone to achieve visible and invisible data embedding and/or encoding into images as part of the halftoning and printing process.

FIG. 1 illustrates a $2^{nd}$ generation halftoning method that manipulates the spatial distribution of seed points in a $2^{nd}$ generation halftone to achieve visible and invisible data embedding and/or encoding into images as part of the halftoning and printing process. The $2^{nd}$ generation halftoning method described in U.S. application Ser. No. 13/096,429 filed Apr. 28, 2011 and entitled PARAMETRICALLY CONTROLLED HALFTONE SPOT FUNCTION FOR AN IRREGULAR HALFTONE GRID (which is hereby incorporated by reference in its entirety) places nuclei (seeds) in a frequency modulated (FM) stochastic manner up to a particular gray level, then grows them in size in an amplitude modulated (AM) manner above that level. The methods described herein adaptively determine the FM-to-AM transition threshold according to the presence or absence of a watermark at given spatial locations. FIG. 1 contains a block diagram of the algorithm.

According to the method, at 10, contone image data (FIG. 3A) and watermark data (FIG. 3B) are received. At 12, seed frequency is determined for generating a halftone image. Seed locations (seed frequency) are determined based on presence or absence of the watermark and gray level of input image at given locations within the image. At 14, seeds are placed or positioned. At 16, the seeds are tessellated to form a plurality of triangles having the seeds as vertices. At 18, a halftoning spot function is calculated based on the tessellation determined by the seed locations. At 20, a thresholding algorithm is executed. That is, thresholds of the spot function are applied to the image to produce the watermarked halftone. At 22, a halftone image comprising the original image and the watermark data is generated and output. The amount by which the FM-to-AM threshold is varied determines the degree of visibility of the watermark: larger threshold gaps mean greater visibility. In one embodiment, two threshold arrays are generated using two spot functions with different FM-to-AM thresholds for watermarked and non-watermarked regions of the image. The thresholds are applied to the image using the watermark and non-watermark locations as a switch between the two threshold arrays. In this embodiment, the set of seeds that give rise to the high frequency array is a superset of the set of seeds that give rise to the low frequency array. In other words, both arrays share the same set of seeds, namely, the seeds from which the low frequency array is calculated, and the high frequency array has additional seeds that result in a smaller average distance between seeds. This ensures that transitions between watermark and non-watermark regions in the resulting binary image are as smooth as possible. In another embodiment the seeds are generated according to the watermark and non-watermark locations, and the spot function and thresholds are generated based on those seeds.

In one embodiment, halftoning is performed with two threshold arrays, one for watermark areas and one for non-watermark areas, using the watermark as a switch. The two threshold arrays are generated using seeds and spot functions. One array is generated with seeds that are a superset of the seeds used to generate the other array. The array generated with the superset has a higher FM-to-AM transition threshold. There can be more than one way to generate the seeds. For instance, the seeds can be generated using a single stochastic (FM) screen. The seeds for the array with the lower FM-to-AM threshold are generated using pixels in the FM up to a certain gray level threshold. The seeds for the array with the higher FM-to-AM threshold are generated using pixels in the FM up to a gray level threshold that is higher. By using the same FM screen to generate the two sets of seeds, there is a smooth transition between watermark and non-watermark areas in the halftoned image. Given the seeds for a threshold, one of the described spot functions is applied to generate thresholds for the extent of the array. The thresholds can be offset, scaled, etc., to fit the gray range of the printer and the printing characteristics. Also, secondary criteria can be used to raise or lower a given threshold so that multiple pixels do not have the same threshold around a given seed. The arrays are tiled to fill the extent of the image, as is done for array-based halftoning. Each pixel in the image thus has an associated and co-located threshold in the arrays. A threshold is chosen from one array or the other based on the watermark switch (i.e., whether or not the pixel for which the threshold is being chosen is in a watermark region or a non-watermark region.)

In another embodiment, a watermarked halftone image is generated using $2^{nd}$ generation stochastic halftoning to binarize pixels. For instance, a contone input image and watermark image data are received (e.g., by a processor or the like), along with a set of seeds at a first principal frequency and a set of seeds at a second principal frequency. The processor then places seeds from the first and second sets in regions of watermark and non-watermark image data, respectively, determines a tessellation for the resulting set of seeds, and calculates a halftone spot function corresponding to the resulting tessellation. The processor then compares pixel values with co-located halftone spot function values to generate binary pixel values, and outputs the watermarked halftone image (e.g., for printing or the like).

It will be appreciated that the method of FIG. 1 can be implemented by a computer 30, which comprises a processor (such as the processor 304 of FIG. 12) that executes, and a memory (such as the memory 306 of FIG. 12) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 12), a system memory (see, e.g., FIG. 12), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
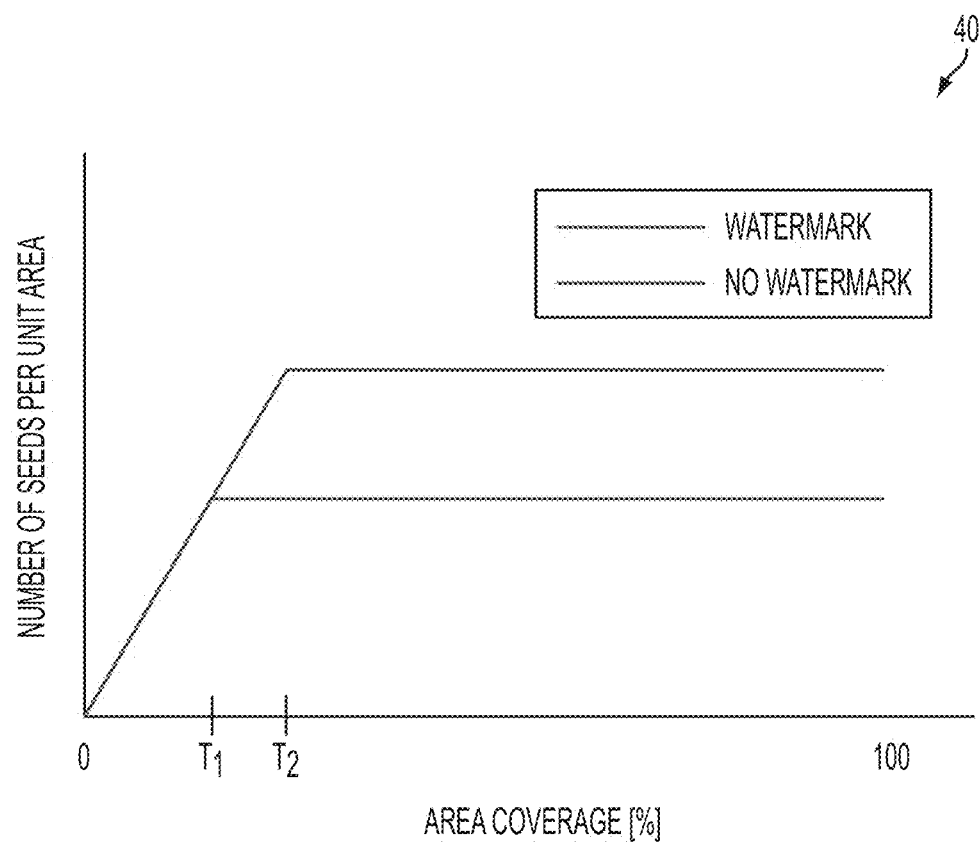
FIG. 2 shows a graph of the number of seeds per unit area as a function of gray level for portions of the image with and without a watermark, where $T_1$ and $T_2$ represent the thresholds determining the FM to AM transitions for the image and the watermark respectively.

With continued reference to FIG. 1, FIG. 2 shows a graph 40 of the number of seeds per unit area as a function of gray level for portions of the image with and without a watermark, where $T_1$ and $T_2$ represent the thresholds determining the FM to AM transitions for the image and the watermark respectively. Note that the two curves are interchangeable, that is, the watermark can be assigned a higher ($T_2 > T_1$) or a lower ($T_1 > T_2$) seed frequency than the carrier image. The visibility of the watermark can be controlled by adjusting the distance between $T_1$ and $T_2$. That is, the threshold values $T_1$ and $T_2$ are adjustable to control the visibility of the watermark, such that reducing the distance or difference between the threshold values decreases the visibility of the watermark, and vice versa.

Figures 3A, 3B:
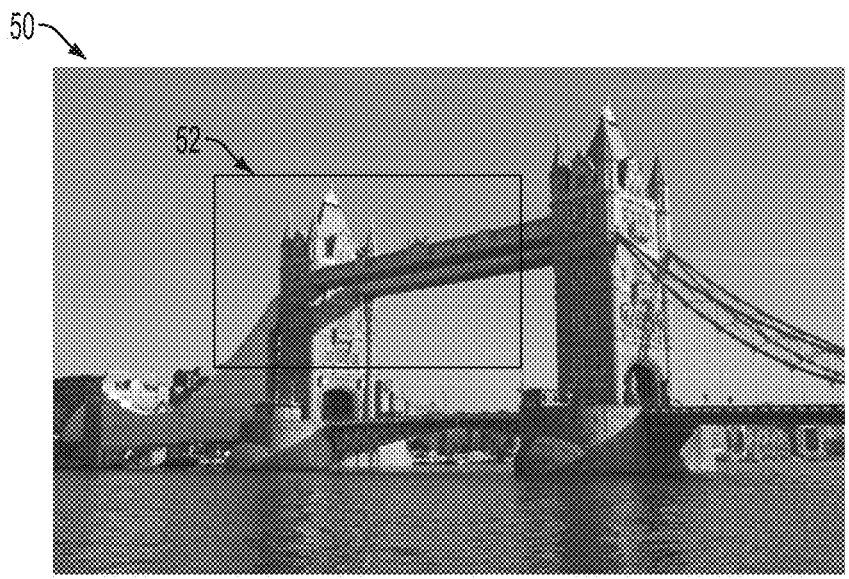
FIG. 3A shows an input contone image with a watermark region in which a watermark will be embedded.
FIG. 3B illustrates the watermark image that will be embedded into the watermark region of the halftone image.
Figure 3C:
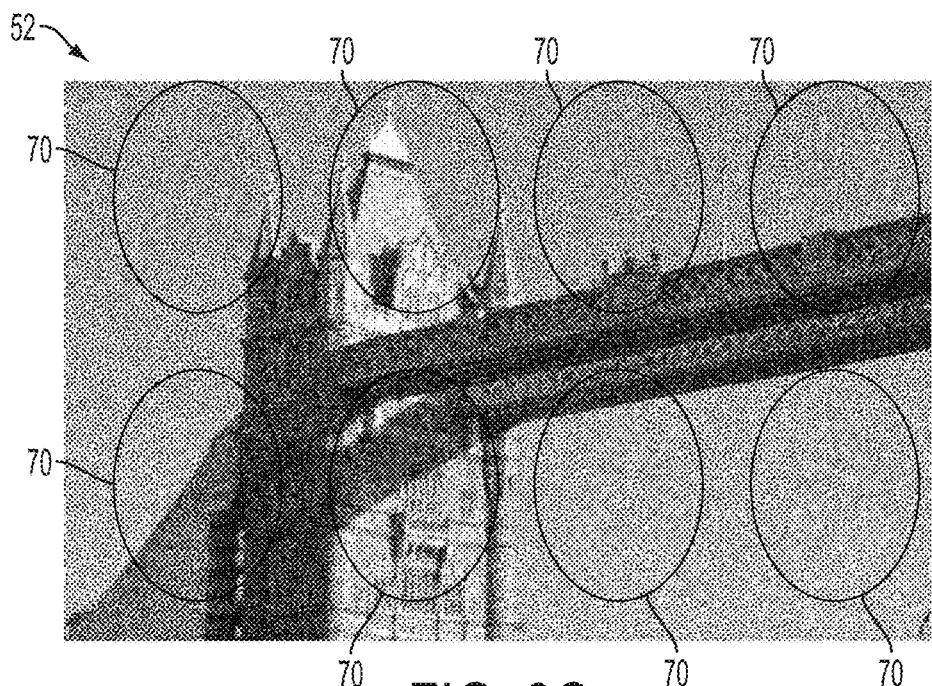
FIG. 3C shows a zoomed-in binary version of the watermark region resulting from embedding the watermark image wherein the difference between the watermark and image frequencies is large enough that the watermark is visible to a human observer.
Figure 3D:
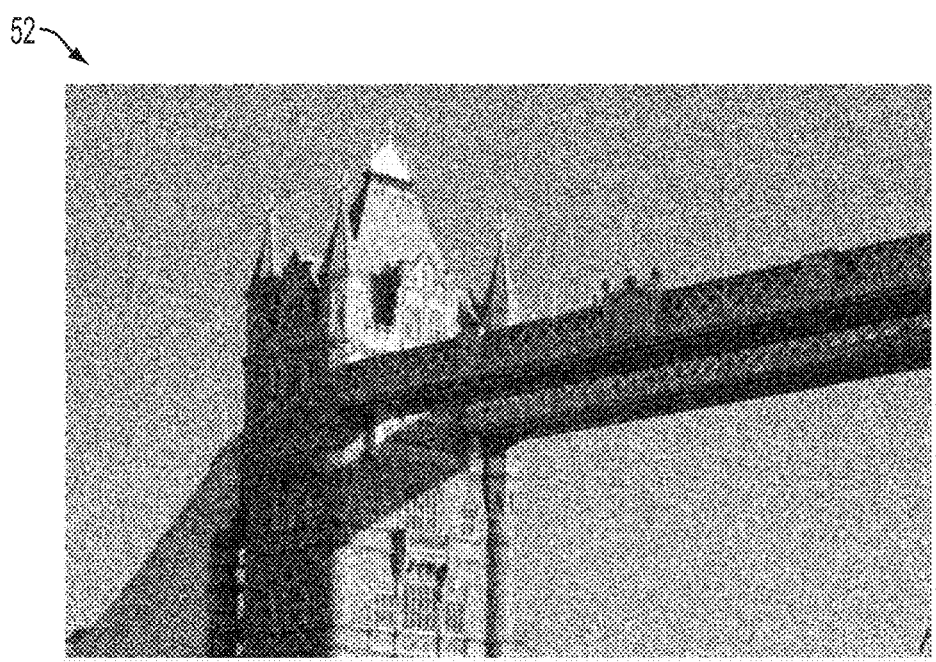
FIG. 3D shows a zoomed-in binary version of the watermark region resulting from embedding the watermark image wherein the difference between the watermark and image frequencies is small enough that the watermark is not visible to a human observer.

FIGS. 3A-3D illustrate an example of an encoded halftoned image according to various aspects described herein. FIG. 3A shows an input contone image 50 with a watermark region 52 in which a watermark will be embedded. FIG. 3B illustrates the watermark image 60 that will be embedded into the watermark region 52 of the halftone image 50. The watermark image 60 of FIG. 3B is used like a mask to select between seed frequencies. FIGS. 3C and 3D show zoomed-in binary versions of the watermark region 52 resulting from embedding the watermark image 60 from FIG. 3B into the image from FIG. 3A according to the algorithm described herein. In this example, letters "A" are used as watermarks with two different seed frequencies showcasing the visibility control allowed by the algorithm. In FIG. 3C, the difference between the watermark and image frequencies is large enough that the watermark is easily visible (e.g., $T_1$=6% and $T_2$=15%). The threshold difference used in FIG. 3D is smaller and falls near the perceptibility threshold of the average human viewer ($T_1$=12% and $T_2$=15%), thus making the watermark image 60 difficult to perceive with the human eye.

Figure 4:
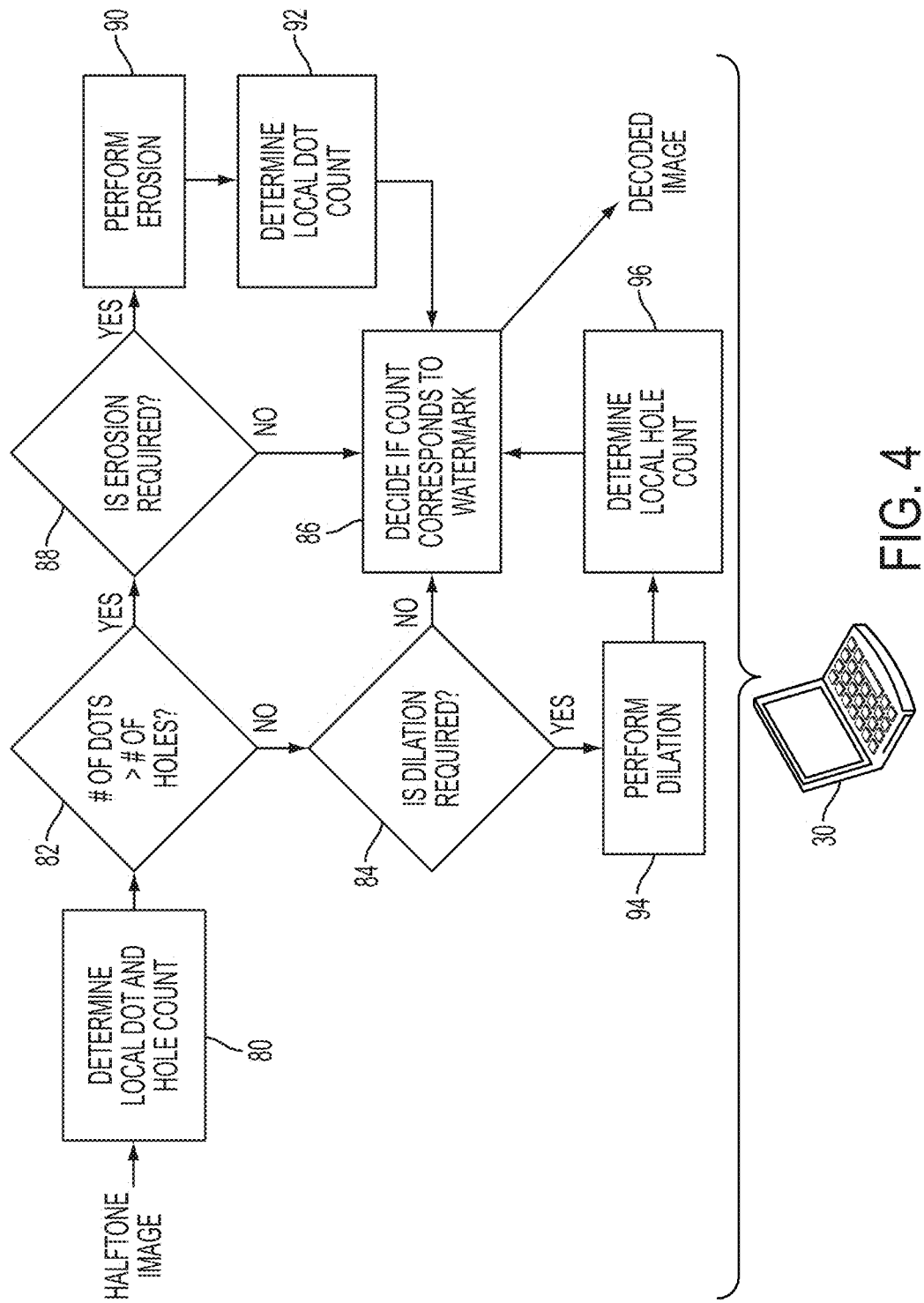
FIG. 4 illustrates a method for decoding the binary images.

FIG. 4 illustrates a method for decoding the binary images that are encoded using the method of FIG. 1. The method may be performed by a computer 30. As used herein, the terms "dot" and "hole" denote sets of 8-connected component ON and OFF pixels respectively. The method facilitates decoding the images using 2 different $2^{nd}$ generation stochastic screens, each having a different principal frequency. According to the method, at 80, a local dot and hole count is determined for a received watermarked halftone image. In one example, determining the local dot and hole count is achieved by analyzing a block or "window" of pixels in the received image (e.g., a 50×50 block of pixels or some other suitably-sized block of pixels that is large enough to encompass a predetermined minimum number of dots (e.g., 5-10 dots or the like)). The window or block size is a function of one or more factors including but not limited to printer resolution, principal frequency of the screen(s) being analyzed, etc.

At 82, a determination is made regarding whether the number of dots is greater than the number of holes. If the number of dots is not greater than the number of holes, then at 84, a determination is made regarding whether a morphological dilation procedure is needed. If not, then at 86 a decision is made regarding whether the count corresponds to a watermark. If the count corresponds to a watermark, then the decoded image is output.

If the determination at 82 indicates that the number of dots is greater than the number of holes, then at 88, a determination is made regarding whether a morphological erosion procedure is needed. If not, then at 86 a decision is made regarding whether the count corresponds to a watermark. If the count corresponds to a watermark, then the decoded image is output. If an erosion procedure is needed, then at 90, the erosion procedure is performed on the image. At 92, a local dot count for the eroded image is determined. The method then proceeds to 86 where a decision is made regarding whether the count corresponds to a watermark. If the count corresponds to a watermark, then the decoded image is output.

If the determination at 84 indicates that a morphological dilation procedure is needed, then at 94 the dilation procedure is performed. At 96, a local hole count for the dilated image is performed. The method then proceeds to 86 where a decision is made regarding whether the count corresponds to a watermark. If the count corresponds to a watermark, then the decoded image is output.

Figure 5:
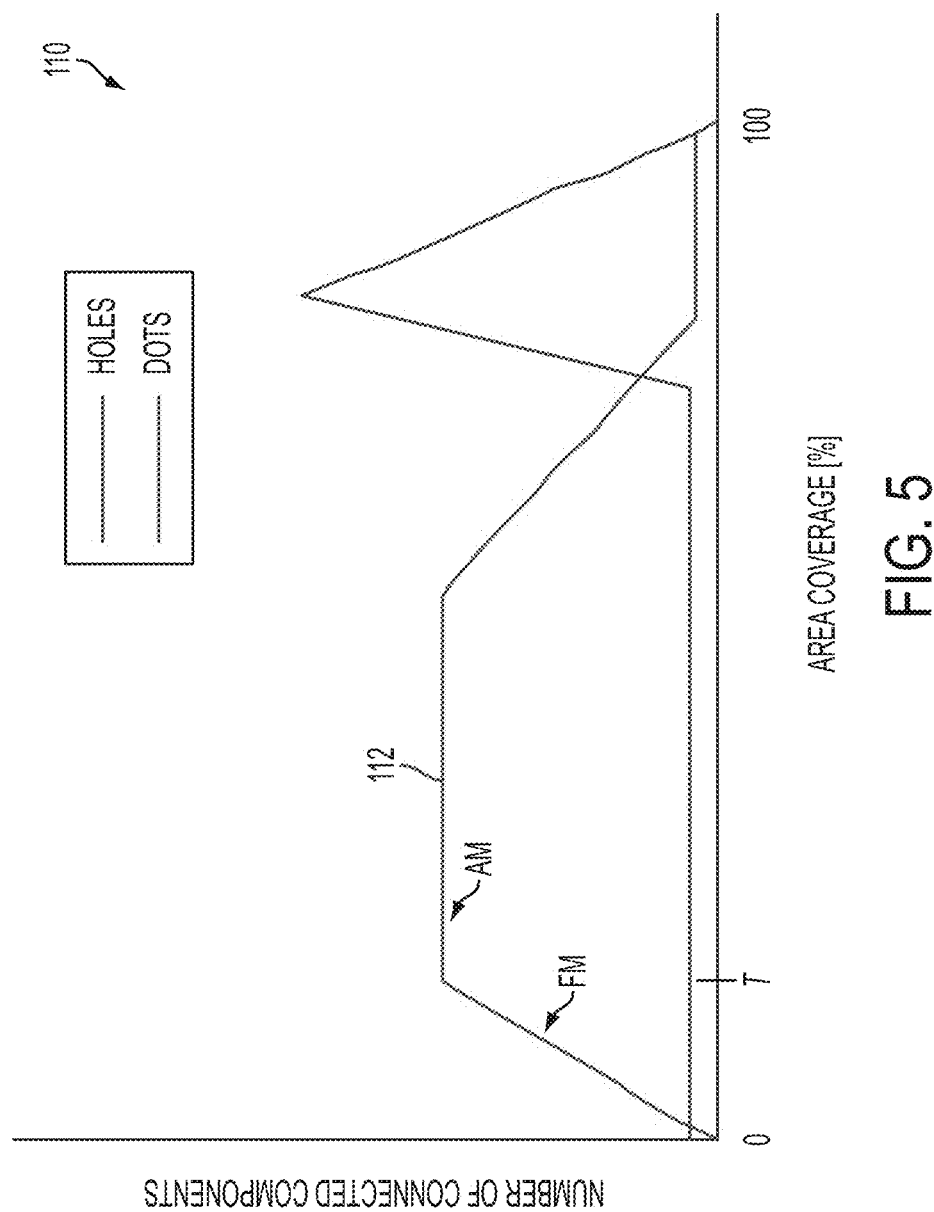
FIG. 5 illustrates a graph that plots the number of dots and holes as a function of gray level for the $2^{nd}$ generation screen, where T denotes the transition threshold from FM to AM mode.

With continued reference to FIG. 4, FIGS. 5-7 illustrate graphs that plot the number of dots and holes in the image or a region thereof at various stages of the method of FIG. 4 as a function of area coverage (gray level), where larger area coverage implies darker image regions and vice versa. The higher the frequency of a screen, the higher the number of connected components that occur before the screen switches from FM mode to AM mode, and the shorter the span of an AM-mode plateau in the signature for the screen. FIG. 5 illustrates a graph 110 that plots the number of dots and holes (connected components) as a function of area coverage (gray level) for a $2^{nd}$ generation screen, where T denotes the transition threshold from FM to AM mode. As the area coverage increases from 0%, the number of dots increases steadily while in the FM region up to the threshold T as the number of seeds increases, and remains stable on a plateau 112 from the point T where the AM mode begins and until the dots start touching each other, at which point it decreases steadily until all pixels in the screen have been turned ON. As the area coverage increases from 0%, the number of holes starts and remains at unity until the touching of dots is widespread enough to start segmenting the white connected region into separate components, at which point the number of said components starts to grow. In the shadows, or regions with large area coverage, holes start filling in steadily until the number of OFF pixels reaches zero. The shape of the plots in FIG. 5 is a signature for the particular screen and depends on the choice of the transition threshold T used for the screen.

Figure 6:
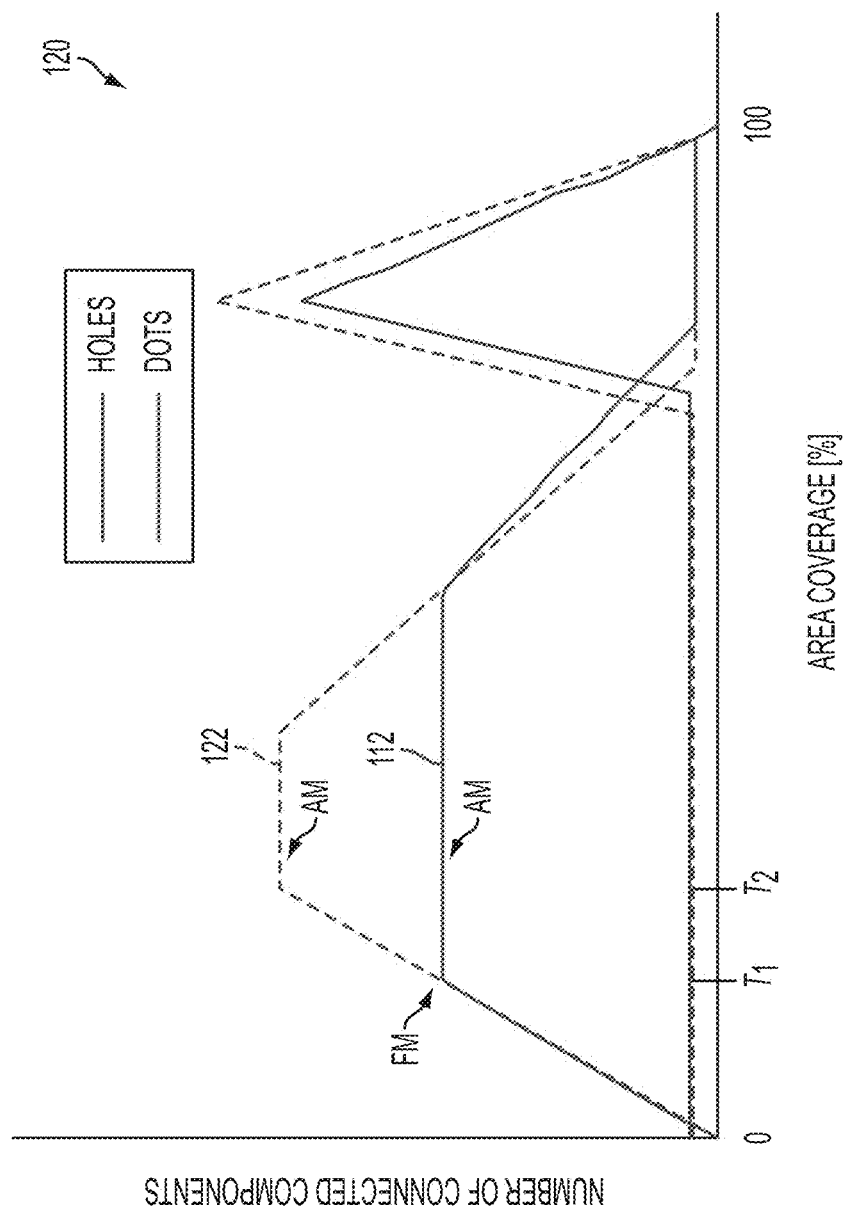
FIG. 6 illustrates a graph that shows signatures for two $2^{nd}$ generation screens using two different transition thresholds, one signature plotted with a continuous line and another one with a dotted line.

FIG. 6 illustrates a graph 120 that shows signatures for two $2^{nd}$ generation screens using two different transition thresholds, a first signature plotted with a continuous line and a second signature plotted with a dotted line. The graph 120 thus shows two screen signatures that may be employed in determining whether a local dot count corresponds to a watermark or not, such as is described with regard to 86 of FIG. 4. For example, if the number of dots detected in the local dot count performed at 80, 92, and/or 96 of the method of FIG. 4 is equal to the number of dots at the plateau 132 of the first signature, then the count is determined to be consistent with a background image region of the received image. However, if the local count is determined to be equal to the number of dots at the plateau 134 of the second screen signature, then the local count is determined to be consistent with a watermarked region of the received image.

In FIG. 6, the first screen signature transitions from FM mode to AM mode at $T_1$, and the second screen signature transitions from FM mode to AM mode at $T_2$. Because the second screen remains in FM mode longer than the first screen, a larger number of connected components are achieved, while the plateau 122 in the second signature has a shorter span than the plateau 112 of the first signature. The larger the transition threshold used, the larger the possible number of connected components, which affects both the dot and hole count. Inspection of FIG. 6 reveals that the number of dots and holes at a portion of the midtones and shadows respectively can be used to discriminate between both screens, while the gray levels below $T_1$, light shadows (regions with small area coverage or low gray levels), and very dark shadows (regions with large area coverage or high gray levels) may not be useable for decoding purposes. The useable grayscale range can be increased by breaking the touch points between dots in the light shadows via morphological erosion and by filling in holes in the shadows via morphological dilation. The decision of whether to use erosion and dilation or not is made based on estimated area coverage information or on a comparison between local dot and hole count and pre-determined thresholds.

According to an example, the first screen signature may have a plateau that extends from a gray level of 50 to a gray level of 200. The second screen signature may have a plateau that extends from a gray level of 70 to a gray level of 170. Because the gray level plateau of the second screen signature extends along a shorter span of gray levels that is within the span of the gray level plateau of the second screen signature, it is determined to have a higher frequency than the first screen signature. That is, because the second screen transition from FM mode to AM mode is made at a higher gray level, a higher frequency of connected components per unit of area is obtained. The higher frequency screen is correlated to watermark signatures, and the lower frequency screen is correlated to the background image.

Figure 7:
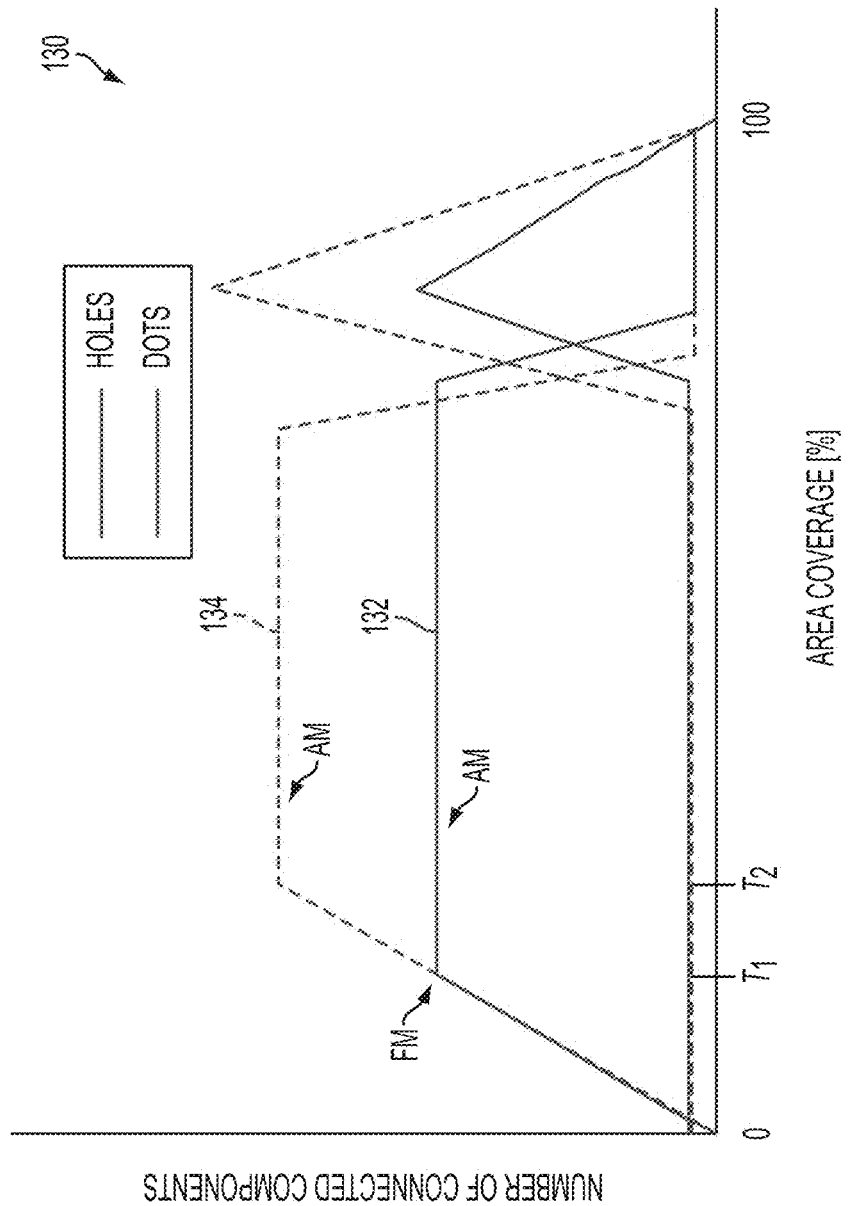
FIG. 7 illustrates a graph of signature curves for $2^{nd}$ generation screens with different transition thresholds after performing morphological erosion and dilation procedures in the dark shadows and light areas respectively.

FIG. 7 illustrates a graph 130 of signature curves for $2^{nd}$ generation screens with different transition thresholds after performing morphological erosion and dilation procedures in the light and dark shadows respectively. As can be seen, the plateau 132 beginning at $T_1$ has been extended for the first screen signature. Similarly, the plateau 134 beginning at $T_2$ has been extended for the second signature.

Figure 8:
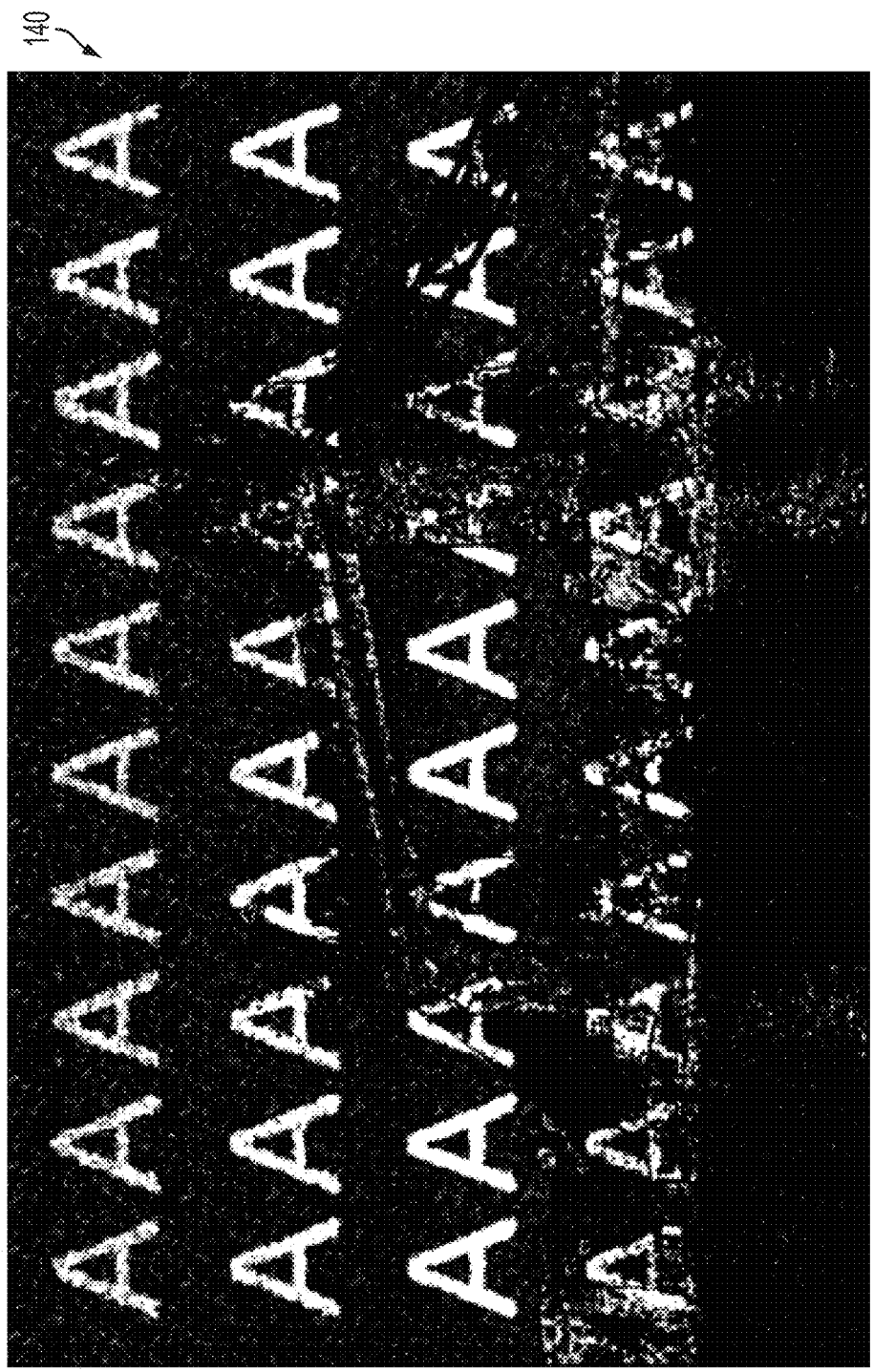
FIG. 8 illustrates a decoded image such as is generated by the method of FIG. 4 by decoding the invisible watermark shown in the image of FIG. 3D.

FIG. 8 illustrates a decoded image 140 such as is generated by the method of FIG. 4 by decoding the invisible watermark shown in the image of FIG. 3D. White pixels denote data identified as watermark. The retrieval of the watermark may not be perfect because some portions of it fall in the unusable gray scale range.

Examples of techniques for generating so-called the second-generation stochastic screens and using their flexibility to accommodate image quality enhancing techniques and other features, are described in: U.S. application Ser. No. 13/096,429 filed Apr. 28, 2011 and entitled PARAMETRICALLY CONTROLLED HALFTONE SPOT FUNCTION FOR AN IRREGULAR HALFTONE GRID; U.S. application Ser. No. 13/096,520 filed Apr. 28, 2011 and entitled POLYGONAL-BOUNDARY-BASED HALFTONE METHOD; and U.S. application Ser. No. 13/108,235 filed May 16, 2011 and entitled DIRECTIONAL HALFTONE METHOD WITH ENHANCED EDGE AND DETAIL RENDITION. The foregoing patent applications are incorporated by reference herein in their entireties. Briefly, to create a $2^{nd}$ generation stochastic screen, "seed" or cluster center locations are determined stochastically. A triangular tessellation is then determined based on the seed locations. A halftone spot function is then evaluated for each triangle based on the tessellation result. A normalized threshold array for the complete $2^{nd}$ generation stochastic screen is then computed. In the present watermarking application, in one embodiment two threshold arrays are generated using two spot functions with different FM-to-AM thresholds. The thresholds are applied to the image using the watermark and non-watermark locations as a switch between the two threshold arrays. In another embodiment the seeds are generated according to the watermark and non watermark locations, and the spot function and thresholds are generated based on those seeds.

Figure 9:
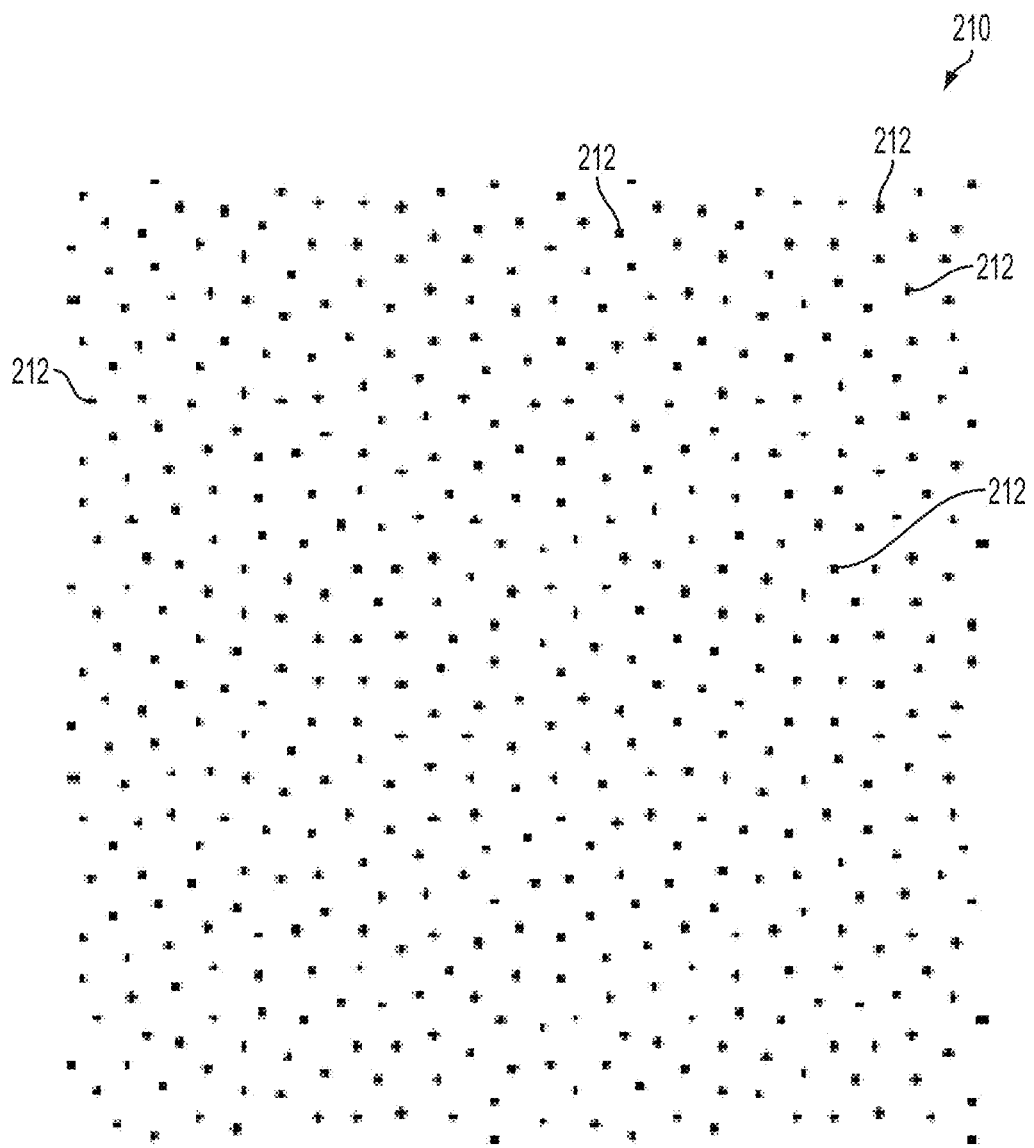
FIG. 9 shows an example of an array of input points or seeds that are defined as "activated" or "on", according to one or more features described herein.
Figure 10:
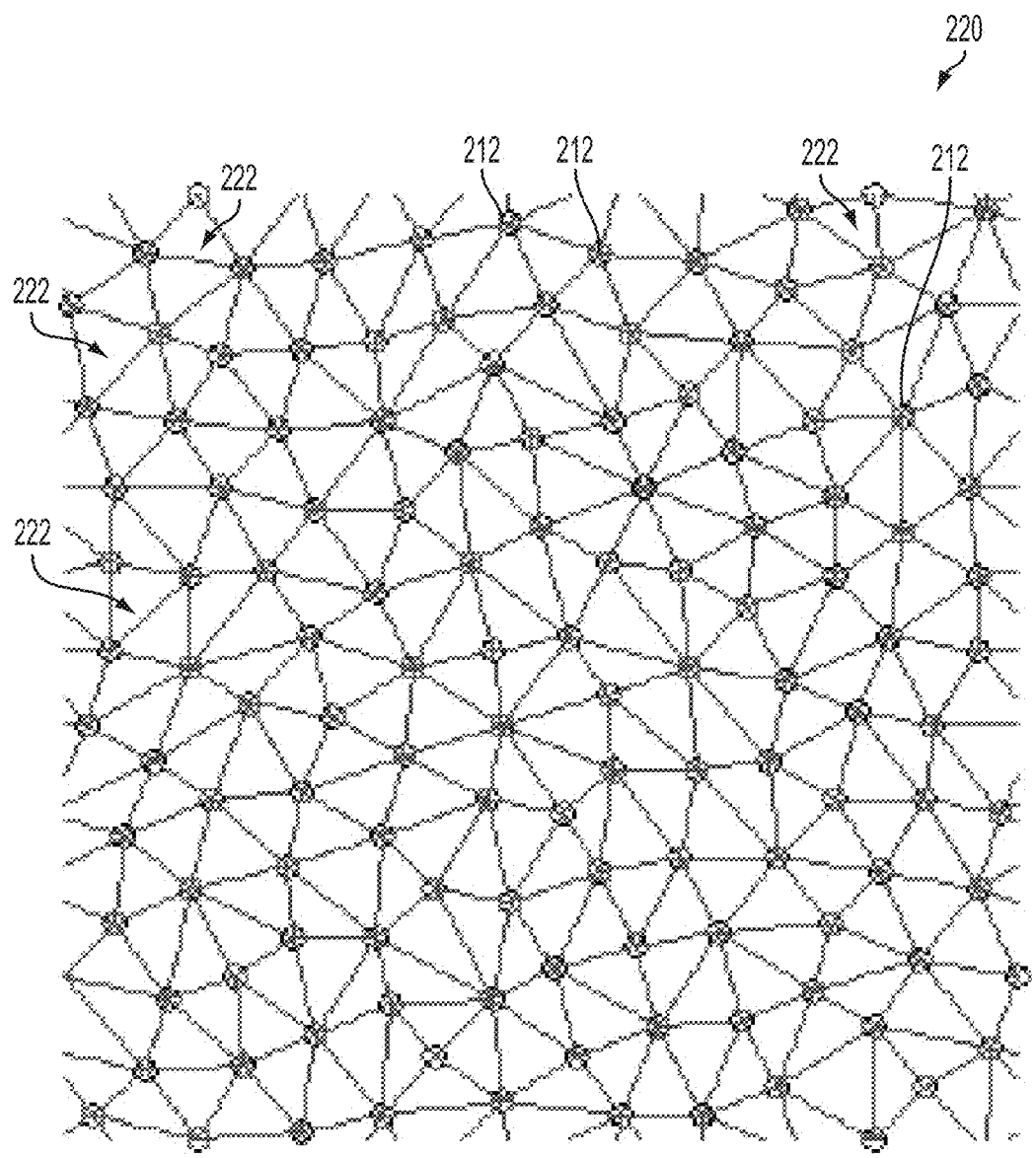
FIG. 10 shows an example of a triangle tessellation for a set of points, in accordance with one or more aspects described herein.
Figure 11:
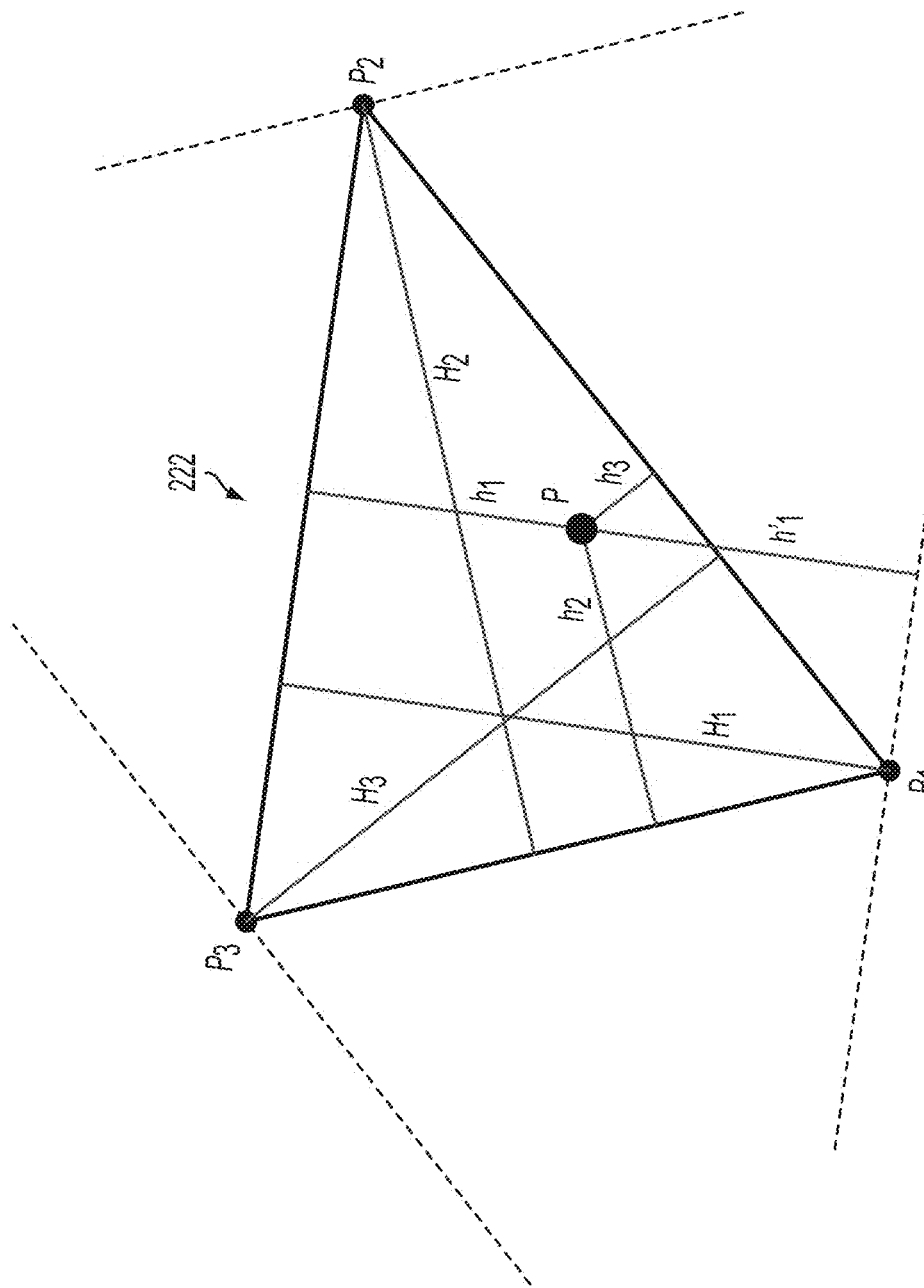
FIG. 11 illustrates a triangle having vertices $P_1P_2P_3$ and which encompasses a pixel P, in accordance with various aspects described herein.

In accordance with various features described herein, FIGS. 9-11 and the following description are provided to facilitate understanding of the generation of $2^{nd}$ generation stochastic screens as described herein. FIG. 9 shows an example of an array 210 of input points or seeds 212 that are defined as "activated" or "on" such as may be determined at step 12 (FIG. 1) and placed or positioned at step 14 (FIG. 1) according to one or more features described herein. The seeds 212 are locations that define the nuclei for growth of the spot function. The seeds can be locations on a regular grid, or irregular locations as used for $2^{nd}$ generation stochastic screens. The seeds can be defined as activated ("on") pixels on a pixel grid, or they can be represented as general spatial coordinates. In one embodiment, the seeds are generated as activated pixels using a stochastic screen halftone up to a target gray level, e.g., 15% area coverage or some other desired gray level, and the spot function grows each halftone dot about its respective seed. In optimizing the stochastic screen used for the seeds, a reduced range of frequency modulation (FM) use (e.g., 0 to 15% area coverage or some other desired range) can be employed, rather than for the full gray range as in conventional practices. When using the described method to generate a halftone cell, the cell can be treated as a hypertile so that seed distribution is not disturbed near the boundary.

FIG. 10 shows an example of a triangle tessellation 220 for a set of points as may be generated at step 16 (FIG. 1), in accordance with one or more aspects described herein. Given the seeds 212, a triangle tessellation is defined or generated based on seed locations. Triangle parameters, such as three heights, are determined for each triangle 222. According to one example, the pixel area that contains the seed locations is divided into triangles 222. The vertices of the triangles are the dot seeds 212. Every dot seed 212 is used as a vertex. By definition of a tessellation, the triangles completely fill the space and do not overlap. If the seeds form a particular periodic structure such as a hexagonal grid, then the tessellation would be regular and formed of congruent triangles. In the case of irregular grids, the tessellation would be irregular and formed of non-congruent triangles.

There are multiple options for forming the triangle tessellation. For example, a Delaunay triangulation algorithm or technique may be employed, in which a circumcircle of any triangle does not contain any other point. The Delaunay triangulation maximizes the minimum angle between vertices thereby avoiding skinny triangles. It may be employed for halftoning applications for that reason. Delaunay triangulation is the dual graph of the Voronoi tessellation, and the described method is naturally suited to operate using the dual Delaunay representation. Compared to any other triangulation of points, the smallest angle in the Delaunay triangulation is at least as large as the smallest angle in any other. However, the Delaunay triangulation does not necessarily minimize the maximum angle.

In another example, a greedy triangulation algorithm or technique is employed, which minimizes the total edge length of the resulting triangulation by adding the shortest internal diagonal to the triangulation at each step. According to another aspect, a polygon triangulation algorithm or technique is used, which decomposes the space into monotonic polygons that can be triangulated efficiently. In yet another example, a radial sweep algorithm or technique is employed, in which the central point of the set is connected to other points radially. Triangles are then formed by connecting radial edges together.

FIG. 11 illustrates a triangle 222 having vertices $P_1P_2P_3$ and which encompasses a pixel P, in accordance with various aspects described herein. The triangle has heights $H_1$, $H_2$, and $H_3$, as well as pixel-intersecting heights $h_1$, $h'_1$, $h_2$, and $h_3$. For a given pixel P, the triangle in which it resides is determined. Once encompassing triangles are defined, relatively straightforward geometric relationships can be used to determine useful triangle parameters, such as triangle heights $H_1$, $H_2$ and $H_3$, etc., as will be appreciated by those of skill in the relevant arts.

There are several contemplated options for determining or identifying the encompassing triangles. For instance, a crossing number technique or algorithm may be employed, which follows a ray that passes through the pixel and identifies the triangle whose sides intersect the ray twice, once on each side of the pixel P. According to another aspect, a winding number technique or algorithm is employed, which counts the number of times the triangle winds around the pixel. If the winding number is 0, the point is outside the triangle; otherwise, it is inside.

It will be appreciated that the step of determining encompassing triangles may optionally be omitted for seed points that lie on a pixel (e.g., "on" or "activated" pixels) rather than seed points that have a spatial coordinate not necessarily congruent with a pixel grid in which the pixels lie. That is, there is not a need to determine the encompassing triangle of a pixel if the pixel is located on a vertex of one or more triangle(s).

For each pixel, distances from its encompassing triangle vertices are determined. The distances are determined from projections onto the triangle altitudes, or similarly, distances to the respective bases. An altitude of a triangle is a straight line through a vertex and perpendicular to the opposite side. The length of the altitude is the height with respect to the given vertex. The opposite side is called the base of the altitude. The distances $h_1$, $h_2$ and $h_3$ are the distances from P to their respective bases, which are opposite $P_1$, $P_2$ and $P_3$ respectively. To implement a well-behaved (e.g., not fragmenting with controlled growth) spot function, the described method uses normalized heights (distances): $h_1/H_1$, $h_2/H_2$ and $h_3/H_3$, in accordance with various aspects.

The determined distances are employed to determine the value of a spot function that generates halftone thresholds. That is, the determined distances are input into the spot function, such as is discussed with regard to step 18 of FIG. 1. The spot function has parameters that can be adjusted to control its sharpness and slope. In one embodiment, the spot function is a weighted sum of three cosines that are functions of the three respective distances. Algebraic powers of the distances control sharpness of each dot touch point with its neighboring dots. Cosine weights control sequencing the touches, such that contact with neighboring dots can occur at different gray levels thereby avoiding instability that occurs for simultaneous touching. The spot function itself can be used to halftone an image, or a sampled version of the spot function can be applied as a threshold array for efficient implementation in a printer. Once all six distance values have been computed, the Q value of the pixel P is computed according to the following formula:

$$Q = a_1 \cos(\pi(2h_1/H_1)) + a_2 \cos(\pi(2h_2/H_2)) + a_3 \cos(\pi(2h_3/H_1)) \quad (1)$$

where $a_i$ are parameters that control the elongation of the dot along the direction defined by $H_i$. Note that since cosine is a symmetric function about $\pi$, the value of Q is the same regardless of whether the distances $h_i$ are calculated with respect to a triangle side or to a line parallel to that side passing through the opposite vertex. For example, the value of Q would be the same if $h'_1 = H_1 - h_1$ is used instead of $h_1$.

If control over the roundness of the dot sides and the sharpness of corner touch points is desired, a new set of parameters $\gamma_i$ can be introduced:

$$Q = a_1 \cos(\pi(2h_1/H_1)^{\gamma_1}) + a_2 \cos(\pi(2h_2/H_2)^{\gamma_2}) + a_3 \cos(\pi(2h_3/H_1)^{\gamma_3}) \quad (2)$$

Note that when $\gamma_i \neq 0$ for some i, the choice over how to measure $h_i$ is no longer arbitrary since the symmetry of Q with respect to $h_i$ is lost. In this case, the selection is constrained to be the distance between the point and whichever line is closest to it, be it the triangle side or its imaginary parallel replication passing through the opposite triangle vertex.

Another level of control can be enabled by inverting the spot function, such that:

$$Q = -(a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3})) \quad (3)$$

The inversion allows for well controlled "holes," which can be desirable for dark image subject matter.

According to another aspect, data normalization is an additional step that can be performed with spot functions. Once all pixels in the matrix are processed, the resulting entries are shifted and scaled to fit the data range, such as [0,255] for an 8-bit system or [0,1023] for a 10-bit image path.

According to related aspects, where the spot function has identical or nearly identical output values for multiple pixels in a dot, the order of the multiple pixels can be determined by any of a number of secondary criteria. For, instance a marking process or imager may mark pixels in a more consistent manner if pixels are preferentially added to a side, such as the lead edge, or trail edge of the dot as it moves through the process or start-of-scan or end-of-scan side of a dot relative to a laser imager scanning direction. For instance, angular considerations can be used to rank pixels. That is, to have minimal displacement of the centroid of the dot from gray level to gray level, pixels with nearly identical dot shape function values are sometimes selected by spiraling around the dot in quadrant (or hextant, etc.) steps. As another example, printed dot consistency is sometimes achieved by preferentially growing a dot in a vertical or horizontal direction where pixels having nearly identical spot function values are ranked to provide more growth in the preferred direction. In some cases, the fill order for pixels of nearly identical spot function values could be random, or selected by any of a number of other criteria.

Figure 12:
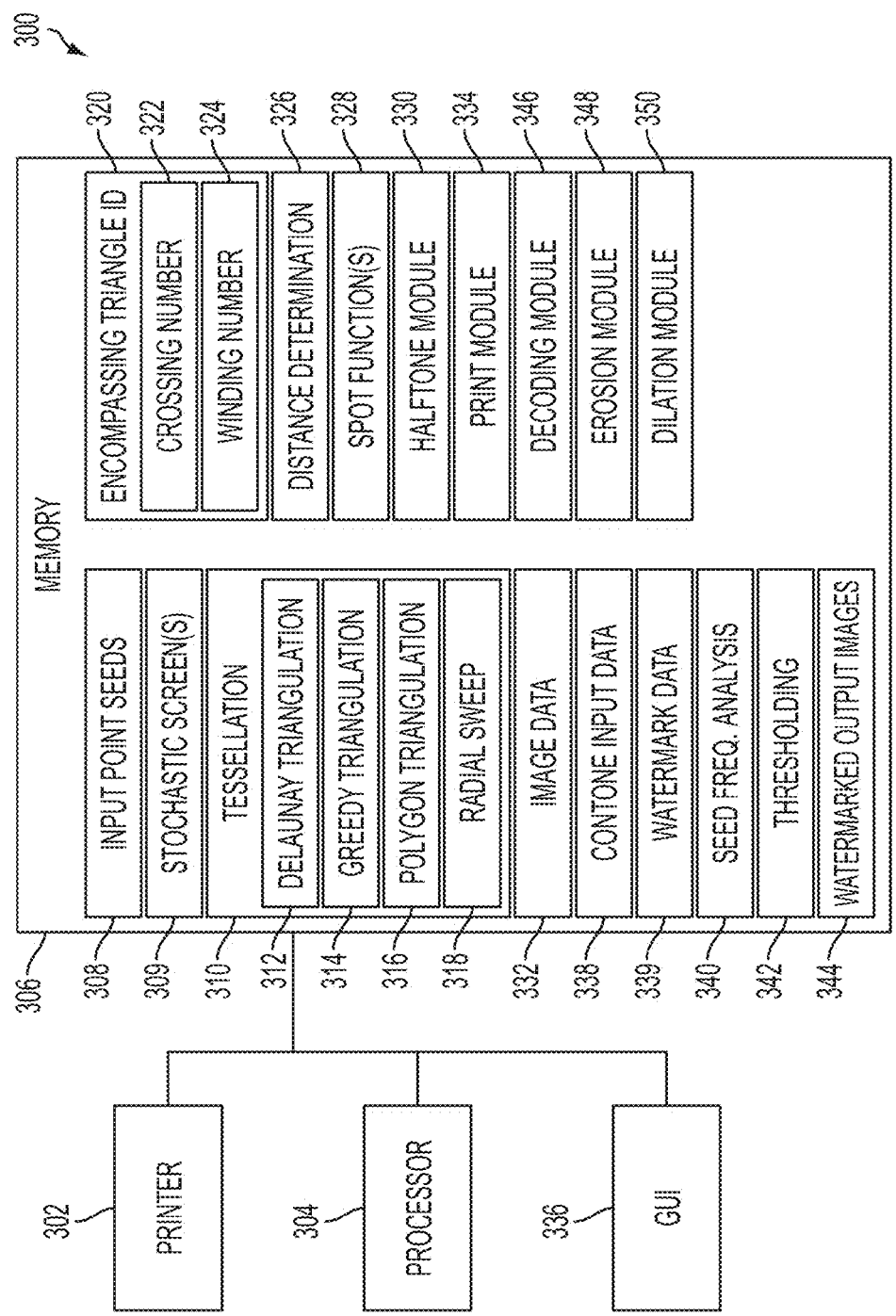
FIG. 12 illustrates a system that facilitates performing the various methods described herein.

FIG. 12 illustrates a system 300 that facilitates performing the various methods described herein. The system comprises a print engine 302 that is coupled to a processor 304 that executes, and a memory 306 that stores computer-executable instructions for performing the various functions, methods, techniques, steps, and the like described herein. The processor 304 and memory 306 may be integral to each other or remote but operably coupled to each other. In another embodiment, the processor 104 and memory 306 are integral to the printer 302. In another embodiment, the processor and memory reside in a computer (e.g., the computer 30 of FIG. 1) that is operably coupled to the printer 302.

As stated above, the system 300 comprises the processor 304 that executes, and the memory 306 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

A set of input points or "seeds" 308 is received or generated from an initial source, such as a stochastic screen 309, or by randomly perturbing locations of seeds arranged in a regular grid, or the like, generated by the processor 304 from an input image scanned by the printing device 302, or from some other suitable source (i.e., the seeds need not come from an input image). The input points 308 and the stochastic screen are stored in the memory 306. The processor 304 executes a triangle tessellation module 310 to generate a triangle tessellation based on the seed locations. For instance, the input points or seeds 308 may be arranged in an irregular or non-uniform grid-like pattern. The tessellation module 310 includes one or more of a Delaunay triangulation module 312. A greedy triangulation module 314, a polygon triangulation module 316, a radial sweep triangulation module 318, or any other suitable triangulation module.

For example, using the Delaunay triangulation module 312, a circumcircle of any triangle is constrained to pass through the three input point seeds forming the triangle without circumscribing any other point seed. The Delaunay triangulation maximizes the minimum angle between vertices thereby avoiding skinny triangles. In another example, the greedy triangulation module 314 is employed, which minimizes the total edge length of the resulting triangulation by adding the shortest internal diagonal to the triangulation at each step. According to another aspect, a polygon triangulation module 316 is executed, which decomposes the space into monotonic polygons that can be triangulated efficiently. In yet another example, a radial sweep module 318 is employed, in which the central point of the set is connected to other points radially. Triangles are then formed by connecting radial edges together.

The processor 304 executes an encompassing triangle identification module 320 that identifies "encompassing" triangles in which a pixel resides on a pixel-by-pixel basis. For instance, a crossing number module 322 can be executed, which follows a ray that passes through a given pixel and identifies the triangle whose sides intersect the ray twice, once on each side of the pixel P. According to another aspect, a winding number module 324 is executed, which counts the number of times the triangle winds around the pixel. If the winding number is 0, the point is outside the triangle; otherwise, it is inside.

The processor 304 executes a distance determination module 326 that determines or calculates each pixel's distance from its encompassing triangle's bases. That is, the distance from each pixel to each base or side of its encompassing triangle is determined or calculated. The distance determination module 326 also calculates or determines three heights for each triangle, including a height from each vertex to its opposite base or side. In this manner, six height or distance values are calculated: three pixel heights $h_1$, $h_2$, and $h_3$, and three triangle heights $H_1$, $H_2$, and $H_3$.

Once the six height values are determined for each pixel, the processor inputs the height values into a spot function (see, e.g., equations (1), (2), and/or (3) described with regard to the preceding FIGURES) on a pixel-by-pixel basis to determine output values that are used to generate halftone thresholds. In one example, the spot function is executed for each pixel as soon as the height values are available. In another example, the spot function is executed for all pixels once all pixels' height values have been determined. The processor 304 then executes a halftone module 330 that uses the spot function output values for each pixel, optionally with one or more secondary criteria or considerations, to halftone an image. Image data 332 is stored in the memory 306 and may include input image data from which an input point seed grid is generated, intermediate image data that is generated at various points during the described process, output image data such as halftone image data, etc. The output image data is provided to a print module 334 that, when executed by the processor 304, generates a set of commands or instructions that are executed by the processor 304 and/or the printer 302 to print the halftone image. In another embodiment, the output halftone image is displayed graphically on a graphical user interface 336 that may be integral to the printer 302, remote but operably coupled thereto, or may reside on a computer such as the computer 30 of FIG. 1. In this manner, the system 300 can be employed to directly halftone an image or can be used to generate a sampled version of the spot function about a collection of seeds to yield a digital halftone cell that can be used to halftone an image.

Additionally, the memory stores data and computer-executable instructions for performing the method described with regard to FIG. 1, including but not limited to contone input image data 338 (see FIG. 3A) and watermark data 339 (see FIG. 3B). A seed frequency analysis module 340 determines a seed frequency for the contone input image for use in seed placement when generating a watermarked halftone image. Seed locations (seed frequency) are determined based on presence or absence of the watermark and gray level of the input image at given locations within the image. The tessellation module 310 tessellates seeds to form a plurality of triangles having the seeds as vertices. A halftoning spot function 328 is calculated based on the tessellation determined by the seed locations. A thresholding module 342 is executed to watermark the halftone output image. That is, thresholds of the spot function are applied to the image to produce the watermarked halftone. Watermarked output halftone image(s) 344 comprising the original image and the watermark data are also stored in the memory for printing or display to a user. The amount by which the FM-to-AM threshold is varied by the thresholding module 342 determines the degree of visibility of the watermark: larger threshold differences correspond to greater visibility to a human observer.

The memory also stores a decoding module 346 that decodes watermarked images be executing the method described with regard to FIG. 4. For instance, the decoding module performs the various dot and hole counts (i.e., initial counts, post-erosion counts, post-dilation counts, etc.) and determines whether an erosion procedure or dilation procedure should be performed on the image to identify whether a watermark is present in the image. To this end, the memory stores an erosion module 348 and a dilation module 350 that are executed by the processor 304 upon being invoked by the decoding module 346. In this manner, the decoding module identifies whether a watermark is present in an image and outputs a decoded image.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for generating a watermarked halftone image using $2^{nd}$ generation stochastic halftoning to binarize pixels, comprising:
   receiving a contone input image and watermark image data;
   determining seed locations based on a gray level of the input image at given locations within the image and based on a presence or absence of a watermark at those locations, where watermark regions have a first FM-to- AM transition threshold and non-watermark regions have a second FM-to-AM transition threshold;

determining a tessellation based on the seed locations;

calculating a halftone spot function to determine a spot function value for each pixel in the input image based on the tessellation determined by the seed locations;

comparing an input pixel value to a co-located spot function value for each pixel in the input image to generate the watermarked halftone image; and outputting the watermarked halftone image.

2. The method according to claim 1, wherein:

the first FM-to-AM transition threshold associated with watermark regions is different than the second FM-to-AM transition threshold, which is associated with non-watermark regions.

3. The method according to claim 1, wherein the FM-to-AM transition threshold values are adjustable such that as a distance between the first and second FM-to-AM transition threshold values is decreased, the watermarked portions of the watermarked halftone image become less visible to a human observer.

4. The method according to claim 1, wherein the spot function is defined as:

$$Q = a_1 \cos(\pi(2h_1/H_1)) + a_2 \cos(\pi(2h_2/H_2)) + a_3 \cos(\pi(2h_3/H_1)) \quad (1)$$

wherein $a_i$ are parameters that control the elongation of a dot along the direction defined by $H_i$, Q is the output value of the spot function, wherein $h_1$, $h_2$ and $h_3$ are pixel-intersecting heights from at least one pixel to respective bases of an encompassing tessellation triangle in which the at least one pixel is located, wherein the encompassing tessellation triangle has heights $H_1$, $H_2$, and $H_3$, and wherein the spot function employs normalized heights $h_1/H_1$, $h_2/H_2$ and $h_3/H_3$.

5. The method according to claim 1, wherein the spot function is defined as:

$$Q = a_1 \cos(\pi(2h_1/H_1)^{\gamma 1}) + a_2 \cos(\pi(2h_2/H_2)^{\gamma 2}) + a_3 \cos(\pi(2h_3/H_1)^{\gamma 3}) \quad (2)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points, wherein $h_1$, $h_2$ and $h_3$ are pixel-intersecting heights from at least one pixel to respective bases of an encompassing tessellation triangle in which the at least one pixel is located, wherein the encompassing tessellation triangle has heights $H_1$, $H_2$, and $H_3$, and wherein the spot function employs normalized heights $h_1/H_1$, $h_2/H_2$ and $h_3/H_3$.

6. The method according to claim 5, wherein the spot function is inverted such that:

$$Q = -(a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})) \quad (3).$$

7. A processor configured to execute computer-executable instructions for performing the method of claim 1, the instructions being stored on a computer-readable medium.

8. A system that facilitates generating a watermarked halftone image using 2nd-generation stochastic halftoning to binarize pixels, comprising:

a memory that persistently stores computer-executable instructions for execution by a processor;

wherein the processor is configured to:

receive a contone input image and watermark image data;

determine seed locations based on a gray level of the input image at given locations within the image and based on a presence or absence of a watermark at the locations within the image, wherein watermark regions have a first FM-to-AM transition threshold and non-watermark regions have a second FM-to-AM transition threshold;

determine a tessellation based on the seed locations;

calculate a halftone spot function to determine a spot function value for each pixel in the input image based on the tessellation determined by the seed locations;

compare an input pixel value to a co-located spot function value for each pixel in the input image to generate the watermarked halftone image; and output the watermarked halftone image to one or more of a printer that prints the watermarked halftone image and a graphical user interface (GUI) on which the watermarked halftone image is displayed.

9. The system according to claim 8, wherein:

the first FM-to-AM transition threshold is associated with watermarked regions and is different than the second FM-to-AM transition threshold, which is associated with non-watermarked regions.

10. The system according to claim 8, wherein the AM-to-FM transition threshold values are adjustable such that as the distance between the first and second AM-to-FM transition threshold values is decreased, the watermarked portions of the watermarked halftone image become less visible to a human observer.

11. The system according to claim 8, wherein the spot function is defined as:

$$Q = a_1 \cos(\pi(2h_1/H_1)) + a_2 \cos(\pi(2h_2/H_2)) + a_3 \cos(\pi(2h_3/H_1)) \quad (1)$$

wherein $a_i$ are parameters that control the elongation of a dot along the direction defined by $H_i$, and Q is the output value of the spot function, wherein $h_1$, $h_2$ and $h_3$ are pixel-intersecting heights from at least one pixel to respective bases of an encompassing tessellation triangle in which the at least one pixel is located, wherein the encompassing tessellation triangle has heights $H_1$, $H_2$, and $H_3$, and wherein the spot function employs normalized heights $h_1/H_1$, $h_2/H_2$ and $h_3/H_3$.

12. The system according to claim 8, wherein the spot function is defined as:

$$Q = a_1 \cos(\pi(2h_1/H_1)^{\gamma 1}) + a_2 \cos(\pi(2h_2/H_2)^{\gamma 2}) + a_3 \cos(\pi(2h_3/H_1)^{\gamma 3}) \quad (2)$$

wherein $a_i$ are parameters that control the elongation of a dot along the direction defined by $H_i$ wherein Q is the output value of the spot function, and wherein $\gamma_i$ is a parameter that governs roundness of the dot sides and the sharpness of corner touch points, wherein $h_1$, $h_2$ and $h_3$ are pixel-intersecting heights from at least one pixel to respective bases of an encompassing tessellation triangle in which the at least one pixel is located, wherein the encompassing tessellation triangle has heights $H_1$, $H_2$, and $H_3$, and wherein the spot function employs normalized heights $h_1/H_1$, $h_2/H_2$ and $h_3/H_3$.

* * * * *